(12) United States Patent
Nagappa et al.

(10) Patent No.: US 12,054,283 B1
(45) Date of Patent: Aug. 6, 2024

(54) LIGHTING SYSTEM FOR PREVENTING BIRD STRIKES AND AIRCRAFT INCORPORATING THE SAME

(71) Applicant: HONEYWELL INTERNATIONAL INC., Charlotte, NC (US)

(72) Inventors: Raghavendra Nagappa, Bangalore (IN); Gokul Murugesan, Bangalore (IN); Jyotismita Sahoo, Bangalore (IN); Senthil Kumar S, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/463,069

(22) Filed: Sep. 7, 2023

(30) Foreign Application Priority Data

Jul. 25, 2023 (IN) .............................. 202311050086

(51) Int. Cl.
| | |
|---|---|
| *B64D 45/00* | (2006.01) |
| *B64C 27/32* | (2006.01) |
| *F21V 7/00* | (2006.01) |
| *F21V 23/02* | (2006.01) |

(52) U.S. Cl.
CPC .............. *B64D 45/00* (2013.01); *B64C 27/32* (2013.01); *F21V 7/0008* (2013.01); *F21V 7/0091* (2013.01); *F21V 23/02* (2013.01); *B64D 2045/0095* (2013.01)

(58) Field of Classification Search
CPC ....... B64D 45/00; B64C 27/32; F21V 7/0008; F21V 7/0091; F21V 23/02
See application file for complete search history.

(56) References Cited

U.S. PATENT DOCUMENTS

| | | | | |
|---|---|---|---|---|
| 1,504,003 | A | * | 8/1924 | Trumbull .............. F04D 25/084 |
| | | | | 362/208 |
| 1,876,625 | A | * | 9/1932 | Daugherty ............ B60R 13/005 |
| | | | | 340/331 |

(Continued)

FOREIGN PATENT DOCUMENTS

| | | |
|---|---|---|
| CA | 3015109 A1 | 2/2020 |
| CN | 111237651 A | 6/2020 |

(Continued)

OTHER PUBLICATIONS

Milman, Oliver, "FAA Aims to Save Millions of Birds by Changing Static Red Airport Lights," Mar. 2016. Downloaded from https://www.theguardian.com/environment/2016/mar/24/airport-lights-birds-faa on Sep. 6, 2023.

(Continued)

*Primary Examiner* — Bryon T Gyllstrom
(74) *Attorney, Agent, or Firm* — Lorenz & Kopf LLP

(57) ABSTRACT

A lighting system for an aircraft having at least one rotationally mounted propeller assembly that includes hub and a plurality of rotor blades extending radially away from the hub includes a light source and an optical element. The light source is mounted within the hub and is configured, upon being energized, to emit light in a first direction. The optical element is mounted within the hub and is disposed to receive the light emitted by the light source and is configured, upon receipt of the light, to redirect the light radially outward from the hub so that the light reflects off the rotor blades.

17 Claims, 3 Drawing Sheets

(56) References Cited

U.S. PATENT DOCUMENTS

| | | | | |
|---|---|---|---|---|
| 3,916,181 | A | * | 10/1975 | Smith .................. F21S 10/02 |
| | | | | 362/35 |
| 4,346,430 | A | | 8/1982 | Holland |
| 4,964,331 | A | | 10/1990 | Halevy et al. |
| 5,270,707 | A | | 12/1993 | Schulte et al. |
| 6,296,378 | B1 | | 10/2001 | Doyen |
| 6,940,424 | B2 | | 9/2005 | Philiben et al. |
| 7,344,264 | B2 | * | 3/2008 | Tamaoki .............. B64D 47/02 |
| | | | | 257/E33.072 |
| 10,585,463 | B1 | * | 3/2020 | Huang ................ G02B 6/0028 |
| 11,326,771 | B2 | * | 5/2022 | Xu ...................... F21V 33/0096 |
| 11,576,366 | B2 | | 2/2023 | Kimsey-Lin et al. |
| 2010/0236497 | A1 | | 9/2010 | Philiben et al. |
| 2017/0203855 | A1 | | 7/2017 | Leclear et al. |
| 2019/0249862 | A1 | * | 8/2019 | Fan ........................ F21V 17/12 |

FOREIGN PATENT DOCUMENTS

| | | |
|---|---|---|
| CN | 214853899 U | 11/2021 |
| CN | 216775914 U | 6/2022 |
| DE | 102014223727 B4 | 8/2019 |
| EP | 236267 A2 | 9/1987 |
| EP | 3269600 A1 | 1/2018 |
| EP | 3072813 B1 | 1/2020 |
| EP | 3419898 B1 | 5/2021 |
| EP | 3851384 B1 | 4/2023 |
| FR | 2982736 B1 | 12/2013 |
| RU | 2773543 C1 | 6/2022 |
| TW | 201336410 A | 9/2013 |

OTHER PUBLICATIONS

Geoghegan, Tom, "10 Ways to Prevent Plane Bird Strikes," BBC News Nov. 6, 2013, downloaded from https://www.bbc.com/news/magazine-24751208 on Sep. 6, 2023.

Dolbeer, Richard A. and Barnes, William J., "Positive Bias in Bird Strikes to Engines on Left Side of Aircraft," Human-Wildlife Interactions 11(1): 33-40, Spring 2017, downloaded from https://digitalcommons.usu.edu/cgi/viewcontent.cgi?article=1396&context=hwi on Sep. 6, 2023.

Cox, John, "Ask the Captain: Landing Lights in my Bedroom Window," USA Today Apr. 12, 2015, downloaded from https://www.usatoday.com/story/travel/columnist/cox/2015/04/12/airplane-landing-lights/25584941/ on Sep. 6, 2023.

Pyke, Chris, "Anti-bird Strike Patent Could Stop Air Crashes Such as the Miracle on the Hudson," Sep. 2, 2016, downloaded from https://www.walesonline.co.uk/business/business-news/anti-bird-strike-patent-could-11817270 on Sep. 6, 2023.

Blackwell, Bradley F., et al., "Exploiting Avian Vision with Aircraft Lighting to Reducue Bird Strikes," Journal of Applied Ecology, 2012, 49, 758-766, downloaded from https://www.researchgate.net/publication/259927901_Exploiting_avian_vision_with_aircraft_lighting_to_reduce_bird_strikes on Sep. 6, 2023.

Kitching, Chris, "Plans for Landing Gear Device on Planes that Mimics Bird Noises to Frighten Fowl and Avoid Mid-air Strikes as Figures Reveal Each Hit Costs 41,000," Daily Mail.com, Oct. 14, 2014, downloaded from https://www.dailymail.co.uk/travel/travel_news/article-2790962/airbus-files-patent-prevent-bird-strikes-warning-sounds.html on Sep. 6, 2023.

Bird Control with Strobe Lights—PCRC, 2009, downloaded from https://www.pigeoncontrolresourcecentre.org/html/reviews/strobe-lights-bird-control.html on Sep. 6, 2023.

Philibin, Scott T., "Efficacy of Aircraft Mounted Lighting to Reduce Bird Strikes," 2005 Bird Strike Committee—USA/Canada 7th Annual Meeting, Aug. 2005, downloaded from https://digitalcommons.unl.edu/cgi/viewcontent.cgi?article=1012&context=birdstrike2005 on Sep. 6, 2023.

Chapter 10 FAA Regulations Policy Handbook, downloaded from https://www.faa.gov/regulations_policies/handbooks_manuals/aviation/airplane_handbook/media/12_afh_ch10 on Jun. 12, 2023.

Adams, Carrie Ann, et al., "Effects of Artificial Light on Bird Movement and Distribution: A systematic Map," Environmental Evidence (2021) 10-37,downloaded from https://environmentalevidencejournal.biomedcentral.com/articles/10.1186/s13750-021-00246-8 on Jun. 12, 2023.

Dolbeer, Richrd A., et al., Bird Hazards to Aircraft: General Guidance for Airports, Flight Crews and Air CarrierPersonnel, Proceedings of 49th Corporate Aviation Safety Seminar, Tucson, AZ, Apr. 27-29, 2004, downloaded from https://www.researchgate.net/profile/Richard-Dolbeer/publication/283251086_Bird_hazards_to_aircraft_General_guidance_for_flight_crews_and_air_carrier_personnel/links/56782f3208aebcdda0ebcd38/Bird-hazards-to-aircraft-General-guidance-for-flight-crews-and-air-carrier-personnel.

Bruderer, Bruno, et al., Behaviour of Migrating Birds exposed to X-band Radar and a Bright Light Beam, Journal of Experimental Biologs 202, 1015-1022 (1999), downloaded from https://journals.biologists.com/jeb/article/202/9/1015/8086/Behaviour-of-migrating-birds-exposed-to-X-band on Jun. 12, 2023.

Blackwell, Bradley F., "Ohio Field Station," Animal and Plant Health Inspection Service, downloaded from https://www.aphis.usda.gov/aphis/ourfocus/wildlifedamage/sa_field/ct_ohio on Sep. 6, 2023.

Courtin, Christopher and R. John Hansman, Safety Considerations in Emerging Electric Aircraft Architectures, MIT International Center for Air Transportation, Report No. ICAT-2018-07, Jun. 2018.

* cited by examiner

LIGHTING SYSTEM FOR PREVENTING
BIRD STRIKES AND AIRCRAFT
INCORPORATING THE SAME

CROSS REFERENCE TO RELATED APPLICATION

The present application claims benefit of prior filed India Provisional Patent Application No. 202311050086, filed Jul. 25, 2023, which is hereby incorporated by reference herein in its entirety.

TECHNICAL FIELD

The present disclosure generally relates to a system for preventing bird strikes, and more particularly to a lighting system for preventing bird strikes and aircraft incorporating the lighting system.

BACKGROUND

The market for Urban Air Mobility (UAM) and Unmanned Aerial Vehicle (UAV) aircraft is emerging and is seen as the future of aviation for both personnel transport over short distances (e.g., air taxis), search and rescue operations, aerial inspections, and transport and delivery of various supplies, just to name a few. The UAM/UAV aircraft are designed to be relatively small in size. Thus, if a UAM or UAV aircraft were to experience a bird strike, the potential deleterious effects could be significantly greater than for other aircraft.

The UAM and UAV aircraft are expected to operate at relatively lower altitudes as compared to other passenger aircraft. Thus, the likelihood that a UAM or UAV aircraft will experience a bird strike is greater as compared to other passenger aircraft.

Hence, there is a need for a system for preventing bird strikes to aircraft, namely UAM and UAV aircraft. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a lighting system for an aircraft having at least one rotationally mounted propeller assembly that includes hub and a plurality of rotor blades extending radially away from the hub includes a light source and an optical element. The light source is mounted within the hub and is configured, upon being energized, to emit light in a first direction. The optical element is mounted within the hub and is disposed to receive the light emitted by the light source and is configured, upon receipt of the light, to redirect the light radially outward from the hub so that the light reflects off the rotor blades.

In another embodiment, an aircraft includes a fuselage, at least one propeller assembly, and a light system. The at least one propeller assembly is rotationally mounted on the fuselage and includes a hub and a plurality of rotor blades extending radially away from the hub. The lighting system includes a light source and an optical element. The light source is mounted within the hub and is configured, upon being energized, to emit light in a first direction. The optical element is mounted within the hub and is disposed to receive the light emitted by the light source and is configured, upon receipt of the light, to redirect the light radially outward from the hub so that the light reflects off the rotor blades.

In yet another embodiment, a lighting system for an aircraft having at least one rotationally mounted propeller assembly that includes hub and a plurality of rotor blades extending radially away from the hub includes a light source, an optical element, and a power source. T light source is mounted within the hub and is configured, upon being energized, to emit light in a first direction. The optical element is mounted within the hub and is disposed to receive the light emitted by the light source and is configured, upon receipt of the light, to redirect the light radially outward from the hub so that the light reflects off the rotor blades. The power supply module is mounted within the hub and is electrically coupled to the light source. The power supply module is configured to electrically energize the light source with a pulse width modulated current having a frequency that matches a rotational frequency of the rotor blades.

Furthermore, other desirable features and characteristics of the lighting system and aircraft will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
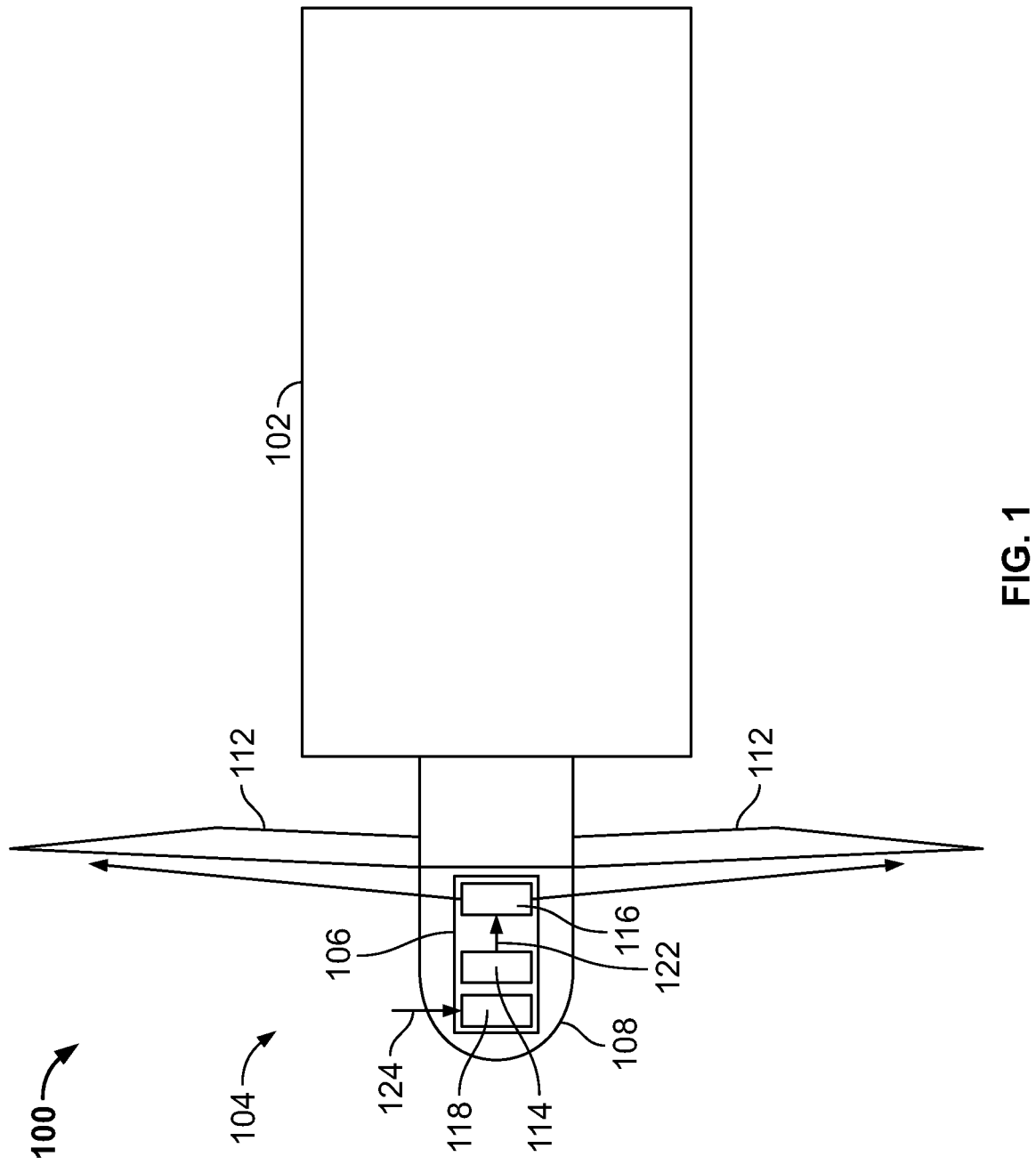
FIG. 1 depicts a functional block diagram of one embodiment of an aircraft.
Figure 2:
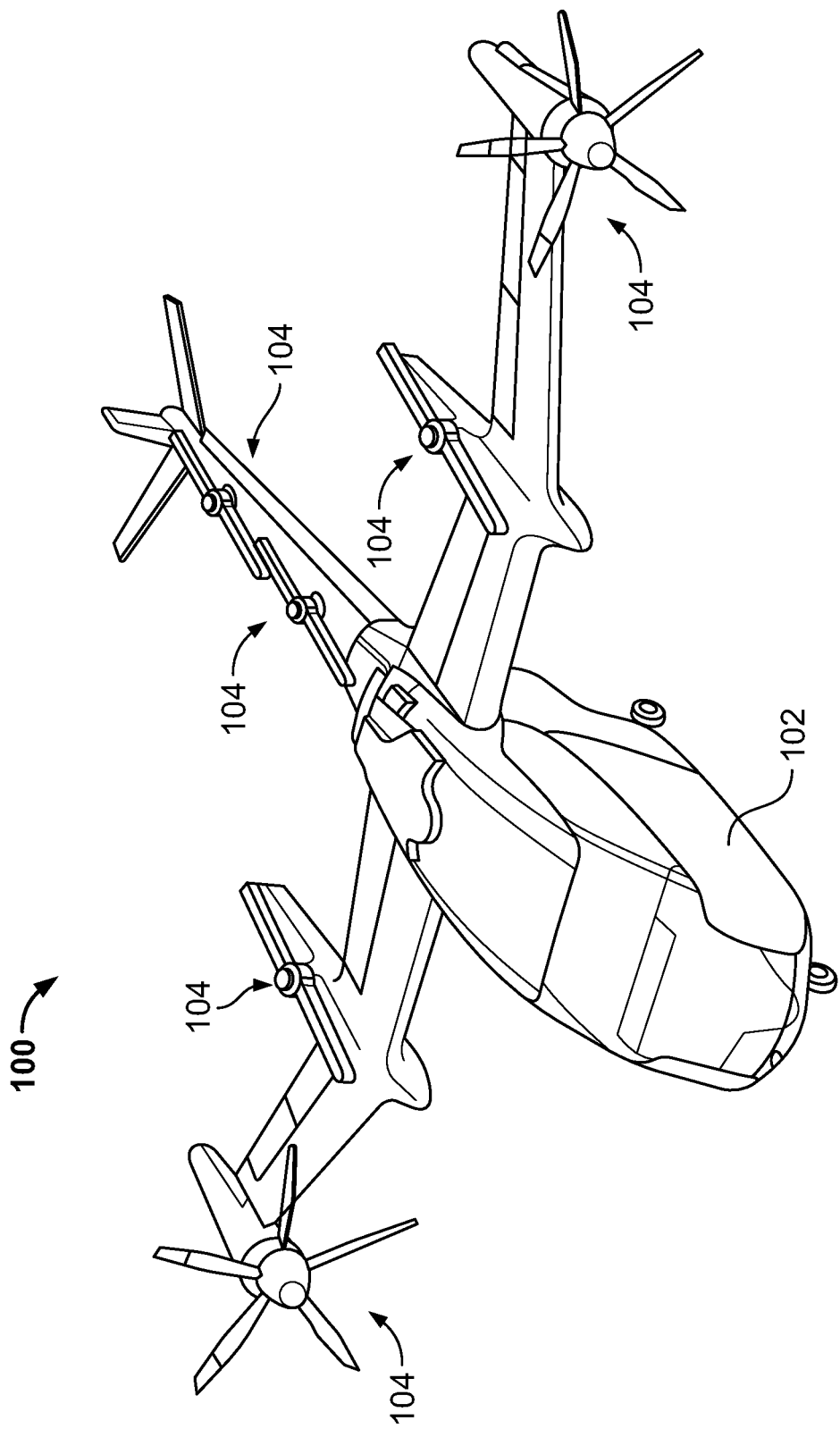
FIG. 2 depicts a perspective view of one embodiment of a physical implementation of the aircraft depicted in FIG. 1.

Referring to FIG. 1, a functional block diagram of one embodiment of an aircraft 100 is depicted. The depicted aircraft 100 includes at least a fuselage 102, at least one propeller assembly 104, and a lighting system 106. The at least one propeller assembly 104 is rotationally mounted on the fuselage 102 and includes a hub 108 and a plurality of rotor blades 112 that extend radially away from the hub 108. Before proceeding further, it is noted that the aircraft 100 may include more than one propeller assembly 104. Moreover, the aircraft 100 may be configured as any one of numerous types of propeller-driven aircraft, such as a helicopter, an airplane, or a UAV aircraft, just to name a few. In one particular embodiment, an example of which is depicted in FIG. 2, the aircraft 100 is configured as a UAM aircraft and includes a plurality of propeller assemblies 104.

Returning to FIG. 1, it is seen that the lighting system 106 is mounted within the hub 108 and includes a light source 114, an optical element 116, and a power supply module 118, all of which are mounted in the hub 108. It should be noted that when the aircraft 100 includes a plurality of propeller assemblies 114, each hub 108 has a separate lighting system 106 mounted therein. Thus, the aircraft 100 depicted in FIG. 2 includes six separate lighting systems 106.

No matter the specific number of lighting systems 106, the light source 114 for each is configured, upon being energized, to emit light in a first direction 122. The first direction 122 may vary, but is generally in a direction away from the hub 108 and toward the fuselage 102. The light source 114 may be implemented using any one of numerous types of devices that emit visible light. For example, the light source 114 may be implemented using one or more light emitting diodes (LEDs), one or more incandescent lights, or one or more halogen lights, just to name a few.

The optical element 116 is disposed to receive the light emitted by the light source 114 and is configured, upon receipt of the light, to redirect the light radially outward from the hub 108 so that the light reflects off the rotor blades 112. The light reflecting off the rotor blades 122 thus diverts birds away from (or out of) the current flight path of the aircraft 100. It will be appreciated that the optical element 116 may be implemented using any one of numerous suitable optical devices for redirecting the light emitted by the light source 114. For example, the optical element 116 may be implemented using a reflector or it may be implemented using a lens, such as a total-internal-reflection (TIR) lens. When it is implemented using a reflector, it may comprise a plastic or metal material having a suitably reflective surface.

The power supply module 118 is electrically coupled to, and is configured to electrically energize, the light source 114. Preferably, the power supply module 118 is configured to electrically energize the light source with a pulse width modulated current. In a particular preferred embodiment, the power supply module 118 is configured with a pulse width modulated current having a frequency that matches the rotational frequency of the rotor blades 112. Thus, as FIG. 1 further depicts, the power supply module 118 may also be coupled to receive a rotational speed signal 124 that is indicative of the rotational speed of the rotor blades 112 and may be further configured, in response to the rotational speed signal 124, to generate the pulse width modulated current having the frequency that matches the rotational frequency of the rotor blades 112. The rotational speed signal may be supplied from a sensor (not illustrated) or an avionics system (not illustrated).

Figure 3:
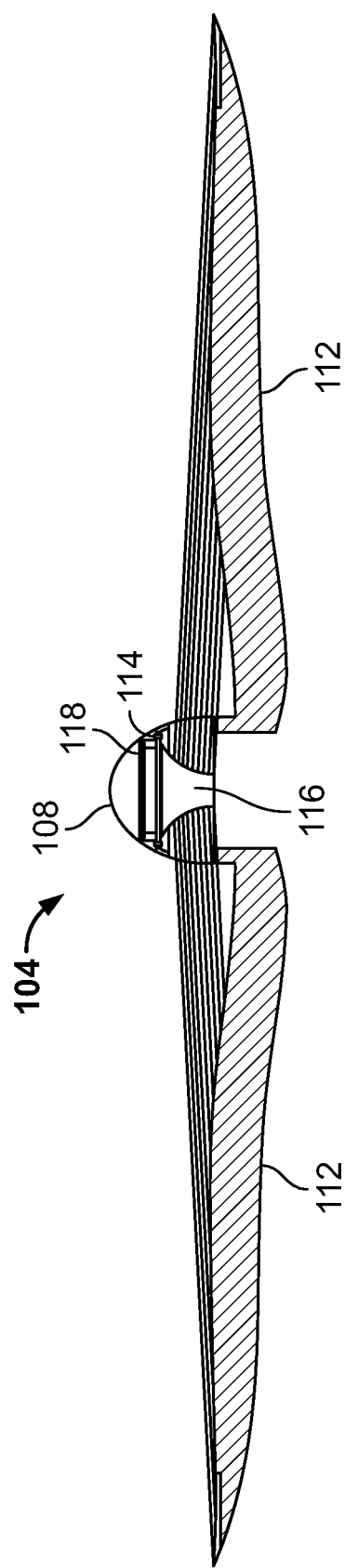
FIG. 3 depicts a cross section view of one embodiment of a propeller assembly and lighting system that may be implemented in the aircraft of FIGS. 1 and 2.

The propeller assembly 104 and lighting system 106 may be physically implemented using any one of numerous configurations. A cross section view of one particular physical implementation is depicted in FIG. 3, and with reference thereto will now be described. As described in the context of FIG. 1, the depicted propeller assembly 104 includes the hub 108 and the plurality of propellers 112 (only two shown), and the light source 114, optical element 116, and power supply module 118 are all mounted within the hub 108. The light source 114 is depicted emitting light in the first direction 122, and the emitted light is depicted being redirected radially outward from the hub 108 so that the light reflects off the rotor blades 112.

Though not mentioned above, in the embodiment depicted in FIG. 3 the hub 108 is at least partially transparent so that the light redirected by the optical element 116 is transmitted through the hub 108. The hub 108 may be constructed, at least partially, of any one of numerous materials to facilitate this light transmission. For example, in one embodiment the hub 108 is at least partially constructed of a transparent polycarbonate material.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the term "radial" (and any derivatives) may encompass directional relationships that are other than precisely aligned with (e.g., oblique to) the true axial and radial dimensions, provided the relationship is predominantly in the respective nominal axial or radial direction.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A lighting system for an aircraft having at least one rotationally mounted propeller assembly, the propeller assembly including hub and a plurality of rotor blades extending radially away from the hub, the lighting system comprising:
   a light source mounted within the hub, the light source configured, upon being energized, to emit light in a first direction; and
   an optical element mounted within the hub and disposed to receive the light emitted by the light source and configured, upon receipt of the light, to redirect the light radially outward from the hub so that the light reflects off the rotor blades,
   wherein:
      the hub is at least partially transparent; and
      the light redirected by the optical element is transmitted through the hub.

2. The lighting system of claim 1, further comprising:
   a power supply module mounted within the hub and electrically coupled to the light source, the power supply module configured to electrically energize the light source.

3. The lighting system of claim 2, wherein the power supply module is configured to electrically energize the light source with a pulse width modulated current.

4. The lighting system of claim 3, wherein the power supply module is configured to electrically energize the light source with a pulse width modulated current having a frequency that matches a rotational frequency of the rotor blades.

5. The lighting system of claim 4, wherein the power supply module is adapted to receive a rotational speed signal indicative of the rotational speed of the rotor blades and is further configured, in response to the rotational speed signal, to generate the pulse width modulated current having the frequency that matches the rotational frequency of the rotor blades.

6. The lighting system of claim 1, wherein the optical element comprises a reflector.

7. The lighting system of claim 1, wherein the optical element comprises a total internal reflection lens.

8. An aircraft, comprising:
   a fuselage;
   at least one propeller assembly rotationally mounted on the fuselage, the propeller assembly including a hub and a plurality of rotor blades extending radially away from the hub, the hub being at least partially transparent; and
   a lighting system, the light system comprising:
      a light source mounted within the hub, the light source configured, upon being energized, to emit light in a first direction; and
      an optical element mounted within the hub and disposed to receive the light emitted by the light source and configured, upon receipt of the light, to redirect the light radially outward from and through the hub so that the light reflects off the rotor blades.

9. The aircraft of claim 8, further comprising:
   a power supply module mounted within the hub and electrically coupled to the light source, the power supply module configured to electrically energize the light source.

10. The aircraft of claim 9, wherein the power supply module is configured to electrically energize the light source with a pulse width modulated current.

11. The aircraft of claim 10, wherein the power supply module is configured to electrically energize the light source with a pulse width modulated current having a frequency that matches a rotational frequency of the rotor blades.

12. The aircraft of claim 11, wherein the power supply module is adapted to receive a rotational speed signal indicative of the rotational speed of the rotor blades and is further configured, in response to the rotational speed signal, to generate the pulse width modulated current having the frequency that matches the rotational frequency of the rotor blades.

13. The aircraft of claim 8, wherein the optical element comprises a reflector.

14. The aircraft of claim 8, wherein the optical element comprises a total internal reflection lens.

15. A lighting system for an aircraft having at least one rotationally mounted propeller assembly, the propeller assembly including hub and a plurality of rotor blades extending radially away from the hub, the lighting system comprising:
   a light source mounted within the hub, the light source configured, upon being energized, to emit light in a first direction;
   an optical element mounted within the hub and disposed to receive the light emitted by the light source and configured, upon receipt of the light, to redirect the light radially outward from the hub so that the light reflects off the rotor blades; and
   a power supply module mounted within the hub and electrically coupled to the light source, the power supply module configured to electrically energize the light source with a pulse width modulated current having a frequency that matches a rotational frequency of the rotor blades.

16. The lighting system of claim 15, wherein:
the hub is at least partially transparent; and
the light redirected by the optical element is transmitted through the hub.

17. The lighting system of claim 15, wherein the power supply module is adapted to receive a rotational speed signal indicative of the rotational speed of the rotor blades and is further configured, in response to the rotational speed signal, to generate the pulse width modulated current having the frequency that matches the rotational frequency of the rotor blades.

* * * * *